(12) United States Patent
Lee

(10) Patent No.: US 12,481,428 B2
(45) Date of Patent: Nov. 25, 2025

(54) STORAGE DEVICE AND A METHOD OF OPERATING THE STORAGE DEVICE, AND A VEHICLE INCLUDING THE STORAGE DEVICE

(71) Applicant: SAMSUNG ELECTRONICS CO., LTD., Suwon-si (KR)

(72) Inventor: Chul Ho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 61 days.

(21) Appl. No.: 18/053,472

(22) Filed: Nov. 8, 2022

(65) Prior Publication Data

US 2023/0236736 A1    Jul. 27, 2023

(30) Foreign Application Priority Data

Jan. 24, 2022   (KR) .................. 10-2022-0009652

(51) Int. Cl.
*G06F 3/06* (2006.01)
(52) U.S. Cl.
CPC .......... *G06F 3/0616* (2013.01); *G06F 3/0653* (2013.01); *G06F 3/0679* (2013.01)
(58) Field of Classification Search
CPC .... G06F 3/0616; G06F 3/0653; G06F 3/0679; G06F 3/0617; G06F 3/0658; G06F 3/0604; G06F 3/0614; G06F 11/0751; G11C 29/42; G11C 2029/5002; G11C 29/52
See application file for complete search history.

(56) References Cited

U.S. PATENT DOCUMENTS

| | | | |
|---|---|---|---|
| 5,912,836 A | 6/1999 | Liu et al. | |
| 6,002,611 A | 12/1999 | Ogura et al. | |
| 6,391,665 B1 | 5/2002 | Chang et al. | |
| 6,654,349 B1 | 11/2003 | Lee | |
| 7,102,544 B1 * | 9/2006 | Liu ..................... | G06F 11/1032 |
| | | | 711/119 |
| 7,492,649 B2 | 2/2009 | Takase | |
| 8,429,485 B2 * | 4/2013 | Kim ................. | H03M 13/3707 |
| | | | 714/752 |
| 8,560,772 B1 | 10/2013 | Piszczek et al. | |
| 9,026,867 B1 | 5/2015 | Northcott et al. | |
| 9,514,845 B1 * | 12/2016 | Wu ....................... | G11C 29/44 |

(Continued)

FOREIGN PATENT DOCUMENTS

| | | |
|---|---|---|
| JP | 2016-157190 | 9/2016 |
| KR | 10-2010-0062191 | 6/2010 |

*Primary Examiner* — Nanci N Wong
(74) *Attorney, Agent, or Firm* — MORGAN, LEWIS & BOCKIUS LLP

(57) ABSTRACT

A storage device includes a cell degradation measurement circuit configured to receive a cell degradation information request command that requests cell degradation information from a host, and provide first cell degradation information to the host in response to the cell degradation information request command, and a non-volatile memory including a plurality of memory cells. The cell degradation measurement circuit writes data to any one of the plurality of memory cells in response to the cell degradation information request command. The cell degradation measurement circuit reads the written data after a predetermined time has elapsed. The first cell degradation information is generated based on an error detection operation performed on the read data.

15 Claims, 10 Drawing Sheets

(56) References Cited

U.S. PATENT DOCUMENTS

| | | | |
|---|---|---|---|
| 9,594,611 B2* | 3/2017 | Hashimoto | G06F 11/1417 |
| 10,027,795 B1 | 7/2018 | Maguire et al. | |
| 10,977,120 B2 | 4/2021 | Oh et al. | |
| 10,983,859 B2 | 4/2021 | Davis et al. | |
| 11,036,577 B2 | 6/2021 | Shin et al. | |
| 2010/0174852 A1* | 7/2010 | Chien | G06F 12/0246 |
| | | | 711/E12.008 |
| 2011/0252289 A1* | 10/2011 | Patapoutian | H03M 13/29 |
| | | | 714/763 |
| 2013/0179624 A1* | 7/2013 | Lambert | G06F 12/0246 |
| | | | 711/E12.008 |
| 2019/0295665 A1* | 9/2019 | Kojima | G11C 16/32 |
| 2020/0317196 A1* | 10/2020 | Yoshida | B60W 30/181 |
| 2020/0401326 A1* | 12/2020 | Fujimoto | G06F 1/3225 |
| 2022/0044702 A1* | 2/2022 | Maeto | G11B 20/1889 |

* cited by examiner

STORAGE DEVICE AND A METHOD OF OPERATING THE STORAGE DEVICE, AND A VEHICLE INCLUDING THE STORAGE DEVICE

CROSS-REFERENCE TO RELATED APPLICATION

This application claims priority under 35 U.S.C. § 119 to Korean Patent Application No. 10-2022-0009652, filed on Jan. 24, 2022 in the Korean Intellectual Property Office, the disclosure of which is incorporated by reference herein in its entirety.

TECHNICAL FIELD

Embodiments of the present disclosure relate to a storage device, a method of operating the storage device, and a vehicle including the storage device. For example, embodiments of the present disclosure relate to a storage device that determines a degree of degradation of a memory cell included in a storage device, a method of operating the storage device, and a vehicle including the storage device.

DISCUSSION OF RELATED ART

A user of a storage device may request the storage device to determine the degree of degradation of a memory cell of the storage device to prepare for failure of the storage device.

For example, in the case of an automotive system, failure of a memory cell may lead to an accident of a vehicle or a loss of life, and there is a further demand for a function that may detect the failure of a memory cell in advance to prevent such an accident.

SUMMARY

Aspects of the present disclosure provide a storage device capable of determining an accurate degree of degradation of a memory cell included in the storage device.

Aspects of the present disclosure also provide a method of operating a storage device capable of determining an accurate degree of degradation of a memory cell included in the storage device.

Aspects of the present disclosure also provide a vehicle including a storage device capable of determining an accurate degree of degradation of a memory cell included in the storage device.

According to some aspects of the present disclosure, there is a provided storage device including a cell degradation measurement circuit configured to receive a cell degradation information request command that requests cell degradation information from a host, and provide first cell degradation information to the host in response to the cell degradation information request command, and a non-volatile memory including a plurality of memory cells. The cell degradation measurement circuit writes data to any one of the plurality of memory cells in response to the cell degradation information request command, the cell degradation measurement circuit reads the written data after a predetermined time has elapsed, and the first cell degradation information is generated based on an error detection operation performed on the read data.

According to some aspects of the present disclosure, there is a provided method of operating a storage device including receiving a cell degradation information request command that requests cell degradation information from a host, writing data to any one of a plurality of memory cells included in the storage device in response to the cell degradation information request command, reading the written data after a predetermined time has elapsed, and providing the first cell degradation information to the host. The first cell degradation information is generated based on an error detection operation performed on the read data.

According to some aspects of the present disclosure, there is a provided vehicle including an electronic control unit, and a storage device connected to the electronic control unit. The storage device includes a cell degradation measurement circuit which receives a cell degradation information request command from the electronic control unit, and provides first cell degradation information to the electronic control unit in response to the cell degradation information request command, and a non-volatile memory including a plurality of memory cells. The cell degradation measurement circuit writes data to any one of the plurality of memory cells in response to the cell degradation information request command. The cell degradation measurement circuit reads the written data after a predetermined time has elapsed. The first cell degradation information is generated based on an error detection operation performed on the read data.

BRIEF DESCRIPTION OF THE DRAWINGS

The above and other features of the present disclosure will become more apparent by describing in detail embodiments thereof with reference to the accompanying drawings.

DETAILED DESCRIPTION OF THE EMBODIMENTS

Figure 1:
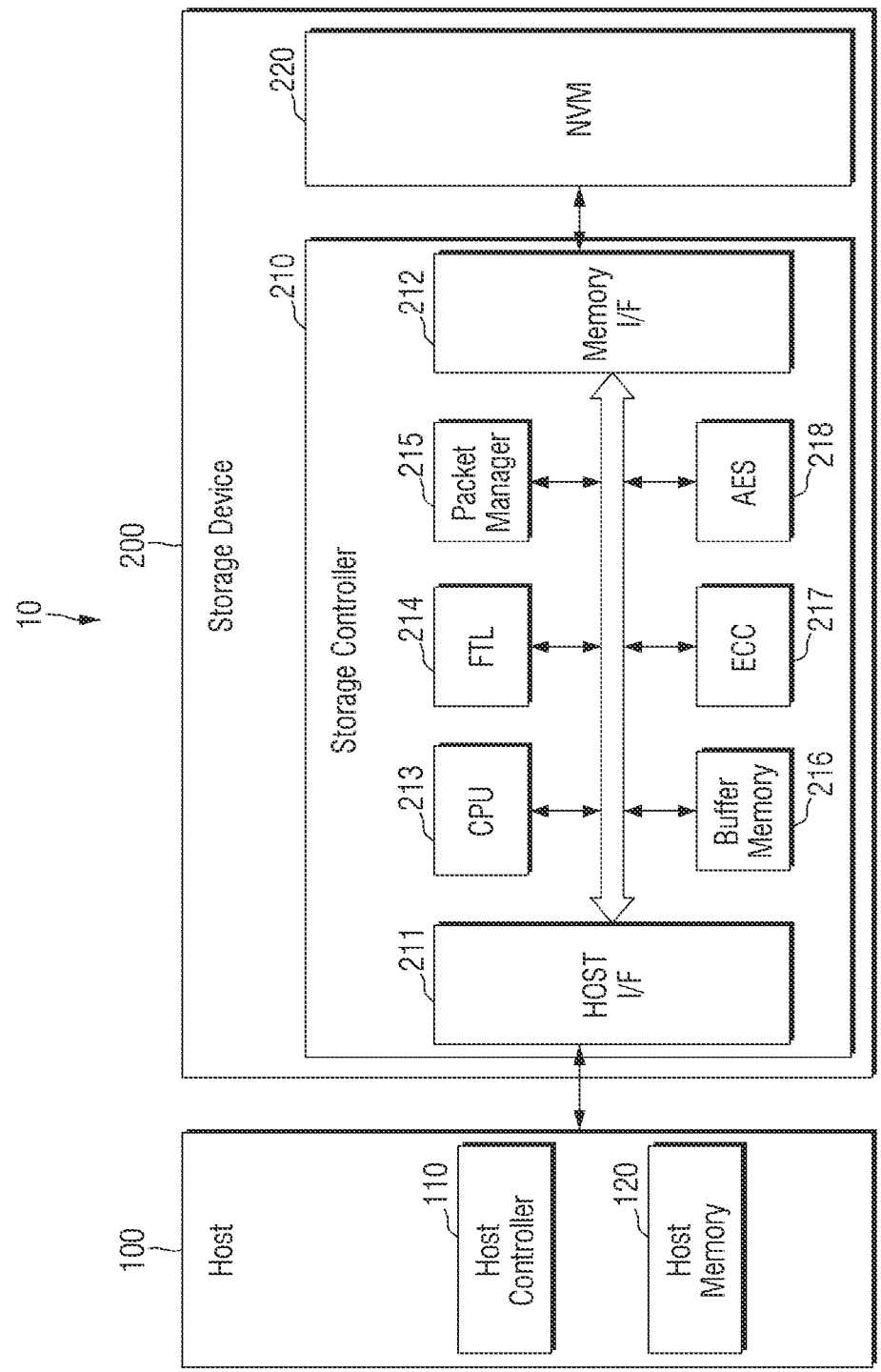
FIG. 1 is a block diagram showing a host-storage system according to some embodiments.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

The term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a block diagram showing a host-storage system according to some embodiments.

A host-storage system 10 may include a host 100 and a storage device 200. The storage device 200 may include a storage controller 210 and a non-volatile memory (NVM) 220. Further, in some embodiments, the host 100 may include a host controller 110 and a host memory 120. The host memory 120 may function as a buffer memory for temporarily storing the data to be transmitted to the storage device 200 or the data transmitted from the storage device 200.

The storage device 200 may include a storage medium for storing data in response to the request from the host 100. As an example, the storage device 200 may include at least one of a solid state drive (SSD), an embedded memory, and a detachable external memory. When the storage device 200 is an SSD, the storage device 200 may be a device that complies with a non-volatility memory express (NVMe) standard.

When the storage device 200 is an embedded memory or an external memory, the storage device 200 may be a device that complies with a universal flash storage (UFS) or an embedded multi-media card (eMMC) standard. The host 100 and the storage device 200 may each generate and transmit packets according to the adopted standard protocol.

When the non-volatile memory 220 of the storage device 200 includes a flash memory, the flash memory may include a 2D NAND memory array or a 3D (or vertical) NAND (VNAND) memory array. As another example, the storage device 200 may include different various types of non-volatile memories. For example, a magnetic RAM (MRAM), a spin-transfer torque MRAM, a conductive bridging RAM (CBRAM), a ferroelectric RAM (FeRAM), a phase RAM (PRAM), a resistive memory (resistive RAM), and various other types of memories may be adopted as the storage device 200.

In some embodiments, the host controller 110 and the host memory 120 may be implemented as separate semiconductor chips. Further, in some embodiments, the host controller 110 and the host memory 120 may be integrated on the same semiconductor chip. As an example, the host controller 110 may be any one of a plurality of modules provided in the application processor, and such an application processor may be implemented as a system on chip (SoC). Further, the host memory 120 may be an embedded memory provided inside the application processor, or a non-volatile memory or a memory module placed outside the application processor.

The host controller 110 may manage an operation of storing the data (for example, write data) of a buffer region in the non-volatile memory 220 or storing the data (for example, read data) of the non-volatile memory 220 in the buffer region.

The storage controller 210 may include a host interface 211, a memory interface 212, and a central processing unit (CPU) 213. The storage controller 210 may further include a flash translation layer (FTL) 214, a packet manager 215, a buffer memory 216, an error correction code (ECC) 217 engine, and an advanced encryption standard (AES) 218 engine.

The storage controller 210 may further include a working memory into which the flash translation layer (FTL) 214 is loaded and when the CPU 213 executes the flash translation layer 214, the data write and read operations on the non-volatile memory may be controlled.

The host interface 211 may transmit and receive packets to and from the host 100. The packets transmitted from the host 100 to the host interface 211 may include, for example, a command, data to be written in the non-volatile memory 220, etc. The packets transmitted from the host interface 211 to the host 100 may include, for example, a response to the command, data that is read from the non-volatile memory 220, etc.

The memory interface 212 may transmit the data to be written in the non-volatile memory 220 to the non-volatile memory 220 or receive the data that is read from the non-volatile memory 220. Such a memory interface 212 may be implemented to comply with standard protocols such as, for example, Toggle or ONFI.

The flash translation layer 214 may perform various functions such as, for example, address mapping, wear-leveling, and garbage collection. Address mapping operation is an operation of changing a logical address received from a host into a physical address which is used for actually storing the data in the non-volatile memory 220. Wear-leveling is a technique for ensuring that blocks in the non-volatile memory 220 are used uniformly to prevent excessive degradation of a particular block, and may be implemented, for example, through a firmware technique for balancing the erasure counts of the physical blocks. Garbage collection is a technique for ensuring an available capacity in the non-volatile memory 220 through a method of copying the valid data of the block to a new block and then erasing the existing block.

The packet manager 215 may generate a packet according to the protocol of the interface discussed with the host 100, or may parse various types of information from the packet received from the host 100. Further, the buffer memory 216 may temporarily store the data to be written in the non-volatile memory 220 or the data to be read from the non-volatile memory 220. The buffer memory 216 may be provided inside the storage controller 210 or be placed outside the storage controller 210 according to embodiments.

The ECC engine 217 may perform error detection and correction functions on the read data that is read from the non-volatile memory 220. For example, the ECC engine 217 may generate parity bits for the write data to be written in the non-volatile memory 220, and the parity bits thus generated may be stored in the non-volatile memory 220 together with the write data. When reading the data from the non-volatile memory 220, the ECC engine 217 may correct errors of the read data, using the parity bits that are read from the non-volatile memory 220, together with the read data, and may output the read data with corrected errors.

The AES engine 218 may perform at least one of an encryption operation and a decryption operation on the data input to the storage controller 210 using a symmetric-key algorithm.

Figure 2:
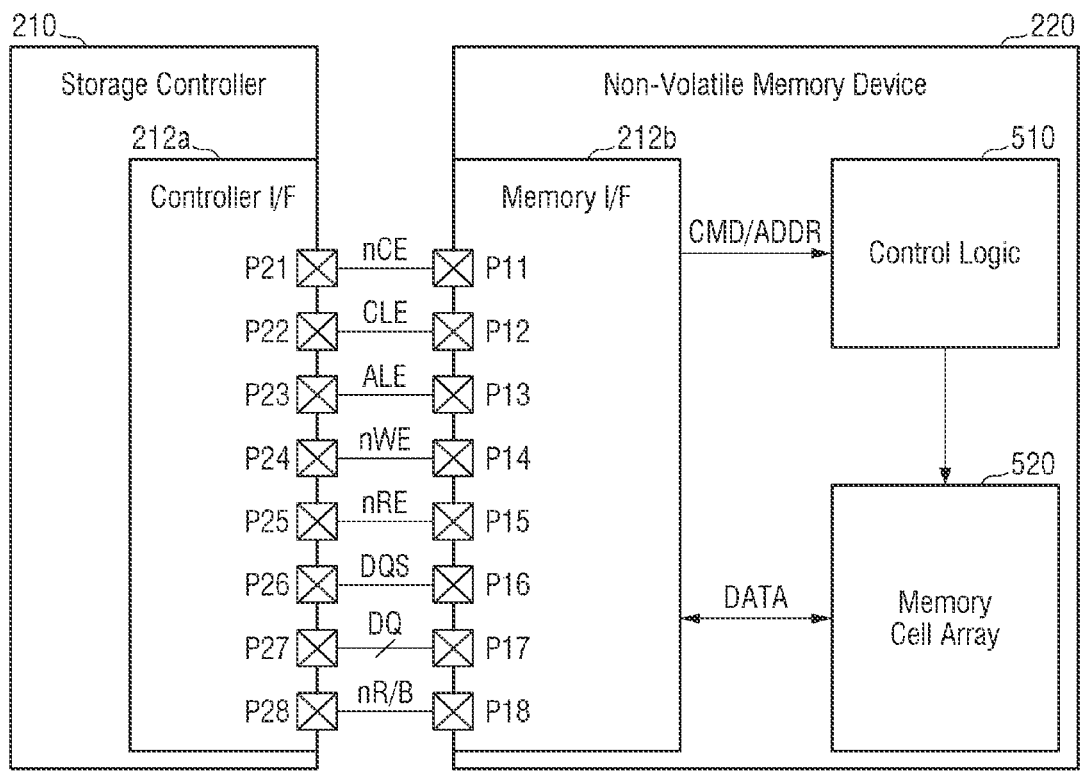
FIG. 2 is a diagram showing the storage controller, the memory interface, and the non-volatile memory of FIG. 1 in a reconfigured manner according to some embodiments.

FIG. 2 is a diagram showing the storage controller, the memory interface, and the non-volatile memory of FIG. 1 in a reconfigured manner according to some embodiments.

The memory interface 212 of FIG. 1 may include a controller interface circuit 212a and a memory interface circuit 212b of FIG. 2.

The non-volatile memory 220 may include first to eighth pins P11 to P18, a memory interface circuit 212b, a control logic circuit 510, and a memory cell array 520.

The memory interface circuit 212b may receive a chip enable signal nCE from the storage controller 210 through a first pin P11. The memory interface circuit 212b may transmit and receive signals to and from the storage controller 210 through second to eighth pins P12 to P18 in accordance with the chip enable signal nCE. For example, when the chip enable signal nCE is in an enable status (e.g., a low level), the memory interface circuit 212b may transmit and receive the signals to and from the storage controller 210 through second to eighth pins P12 to P18.

The memory interface circuit 212b may receive a command latch enable signal CLE, an address latch enable signal ALE, and a write enable signal nWE from the storage controller 210 through second to fourth pins P12 to P14. The memory interface circuit 212b may receive the data signal DQ from the storage controller 210 or transmit the data signal DQ to the storage controller 210 through a seventh pin P17. The command CMD, the address ADDR, and the data DATA may be sent through the data signal DQ. For example, the data signal DQ may be sent through a plurality of data signal lines. In this case, the seventh pin P17 may include a plurality of pins corresponding to the plurality of data signals.

The memory interface circuit 212b may acquire the command CMD from the data signal DQ received in an enable section (e.g., a high level status) of the command latch enable signal CLE based on toggle timings of the write enable signal nWE. The memory interface circuit 212b may acquire the address ADDR from the data signal DQ received in the enable section (e.g., a high level status) of the address latch enable signal ALE based on the toggle timings of the write enable signal nWE.

In some embodiments, the write enable signal nWE holds a static status (e.g., a high level or a low level) and then may toggle between the high level and the low level. For example, the write enable signal nWE may toggle at the section in which the command CMD or the address ADDR is transmitted. Accordingly, the memory interface circuit 212b may acquire the command CMD or the address ADDR based on the toggle timings of the write enable signal nWE.

The memory interface circuit 212b may receive the read enable signal nRE from the storage controller 210 through a fifth pin P15. The memory interface circuit 212b may receive a data strobe signal DQS from the storage controller 210 through a sixth pin P16, or may transmit the data strobe signal DQS to the storage controller 210.

In a data DATA output operation of the non-volatile memory 220, the memory interface circuit 212b may receive the read enable signal nRE that toggles through the fifth pin P15 before output of the data DATA. The memory interface circuit 212b may generate the data strobe signal DQS that toggles based on toggling of the read enable signal nRE. For example, the memory interface circuit 212b may generate the data strobe signal DQS that starts to toggle after a predetermined delay (e.g., tDQSRE) based on a toggling start time of the read enable signal nRE. The memory interface circuit 212b may transmit the data signal DQ including the data DATA based on the toggle timing of the data strobe signal DQS. Accordingly, the data DATA may be arranged at the toggle timing of the data strobe signal DQS and transmitted to the storage controller 210.

In a data DATA input operation of the non-volatile memory 220, when the data signal DQ including the data DATA is received from the storage controller 210, the memory interface circuit 212b may receive the data strobe signal DQS that toggles together with the data DATA from the storage controller 210. The memory interface circuit 212b may acquire the data DATA from the data signal DQ based on the toggle timing of the data strobe signal DQS. For example, the memory interface circuit 212b may acquire the data DATA by sampling the data signal DQ at a rising edge and a falling edge of the data strobe signal DQS.

The memory interface circuit 212b may transmit a ready/busy output signal nR/B to the storage controller 210 through an eighth pin P18. The memory interface circuit 212b may transmit the status information of the non-volatile memory 220 to the storage controller 210 through the ready/busy output signal nR/B. When the non-volatile memory 220 is in a busy status (that is, when the internal operations of the non-volatile memory 220 are being performed), the memory interface circuit 212b may transmit the ready/busy output signal nR/B indicating the busy status to the storage controller 210. When the non-volatile memory 220 is in a ready status (e.g., the internal operations of the non-volatile memory 220 are not performed or are completed), the memory interface circuit 212b may transmit the ready/busy output signal nR/B indicating the ready status to the storage controller 210.

For example, while the non-volatile memory 220 reads the data DATA from the memory cell array 520 in response to a page read command, the memory interface circuit 212b may transmit the ready/busy output signal nR/B indicating the busy status (e.g., a low level) to the storage controller 210. For example, while the non-volatile memory 220 programs the data DATA to the memory cell array 520 in response to the program command, the memory interface circuit 212b may transmit the ready/busy output signal nR/B indicating the busy status to the storage controller 210.

The control logic circuit 510 may generally control various operations of the non-volatile memory 220. The control logic circuit 510 may receive the command/address CMD/ADDR acquired from the memory interface circuit 212b. The control logic circuit 510 may generate control signals for controlling other constituent elements of the non-volatile memory 220 in accordance with the received command/address CMD/ADDR. For example, the control logic circuit 510 may generate various control signals for programing the data DATA in the memory cell array 520 or reading the data DATA from the memory cell array 520.

The memory cell array 520 may store the data DATA acquired from the memory interface circuit 212b under the control of the control logic circuit 510. The memory cell array 520 may output the stored data DATA to the memory interface circuit 212b under the control of the control logic circuit 510.

The memory cell array 520 may include a plurality of memory cells. For example, the plurality of memory cells may be flash memory cells. However, embodiments of the present disclosure are not limited thereto, and the memory cells may be, for example, resistive random access memory (RRAM) cells, ferroelectric random access memory (FRAM) cells, phase change random access memory (PRAM) cells, thyristor random access memory cells (TRAM), and magnetic random access memory (MRAM) cells. Hereinafter, embodiments of the present disclosure will be described mainly based on an embodiment in which the memory cells are NAND flash memory cells.

The storage controller 210 may include first to eighth pins P21 to P28, and a controller interface circuit 212a. The first to eighth pins P21 to P28 may correspond to the first to eighth pins P11 to P18 of the non-volatile memory 220.

The controller interface circuit 212a may transmit the chip enable signal nCE to the non-volatile memory 220 through a first pin P21. The controller interface circuit 212a may transmit and receive signals to and from the non-volatile memory 220 selected through the chip enable signal nCE through the second to eighth pins P22 to P28.

The controller interface circuit 212a may transmit the command latch enable signal CLE, the address latch enable signal ALE, and the write enable signal nWE to the non-volatile memory 220 through the second to fourth pins P22 to P24. The controller interface circuit 212a may transmit the data signal DQ to the non-volatile memory 220 or receive the data signal DQ from the non-volatile memory 220 through a seventh pin P27.

The controller interface circuit 212a may transmit the data signal DQ including the command CMD or the address ADDR to the non-volatile memory 220 along with the toggling write enable signal nWE. The controller interface circuit 212a may transmit the data signal DQ including the command CMD to the non-volatile memory 220 by transmitting the command latch enable signal CLE having the enable status, and may transmit the data signal DQ including the address ADDR to the non-volatile memory 220 by transmitting the address latch enable signal ALE having the enable status.

The controller interface circuit 212a may transmit the read enable signal nRE to the non-volatile memory 220 through a fifth pin P25. The controller interface circuit 212a may receive the data strobe signal DQS from the non-volatile memory 220 through a sixth pin P26, or may transmit the data strobe signal DQS to the non-volatile memory 220.

In the data DATA output operation of the non-volatile memory 220, the controller interface circuit 212a may generate a toggling read enable signal nRE and transmit the read enable signal nRE to the non-volatile memory 220. For example, the controller interface circuit 212a may generate the read enable signal nRE that changes from the static status (e.g., a high level or a low level) to the toggle status before output of the data DATA. Accordingly, the data strobe signal DQS, which toggles based on the read enable signal nRE, may be generated in the non-volatile memory 220. The controller interface circuit 212a may receive the data signal DQ including the data DATA along with the toggling data strobe signal DQS from the non-volatile memory 220. The controller interface circuit 212a may acquire the data DATA from the data signal DQ based on the toggle timing of the data strobe signal DQS.

In the data DATA input operation of the non-volatile memory 220, the controller interface circuit 212a may generate the toggling data strobe signal DQS. For example, the controller interface circuit 212a may generate a data strobe signal DQS that changes from the static status (e.g., a high level or a low level) to the toggle status before transmitting the data DATA. The controller interface circuit 212a may transmit the data signal DQ including the data DATA to the non-volatile memory 220 based on the toggle timings of the data strobe signal DQS.

The controller interface circuit 212a may receive a ready/busy output signal nR/B from the non-volatile memory 220 through an eighth pin P28. The controller interface circuit 212a may determine the status information of the non-volatile memory 220 based on the ready/busy output signal nR/B.

Figure 3:
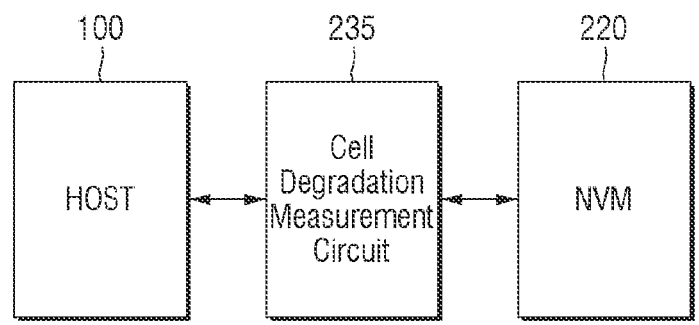
FIG. 3 is an exemplary block diagram for describing an operation of the host-storage system according to some embodiments.

FIG. 3 is an exemplary block diagram for describing an operation of the host-storage system according to some embodiments.

Referring to FIG. 3, the host-storage system 10 may include a host 100, a cell degradation measurement circuit 235, and a non-volatile memory 220.

The host 100 may provide the cell degradation measurement circuit 235 with a cell degradation information request command that requests degradation information about the degree of degradation of the cell.

The cell degradation measurement circuit 235 may provide the first cell degradation information to the host 100 in response to the cell degradation information request command.

For example, the cell degradation measurement circuit 235 may receive a cell degradation information request command from the host 100, and write data to any one of a plurality of memory cells included in the non-volatile memory 220 in response to the cell degradation information request command. Any one cell of the plurality of memory cells may mean a cell whose degree of degradation is desired to be determined.

Subsequently, the written data may be read after a predetermined time has elapsed.

The cell degradation measurement circuit 235 may perform an error detection operation on the read data, and may provide the host 100 with first cell degradation information indicating the degree of degradation for the cell based on the error detection operation. The cell degradation measurement circuit 235 may include the ECC engine 217 described with reference to FIG. 1.

For example, the cell degradation measurement circuit 235 may perform the error detection based on the data read from the memory cells included in the non-volatile memory 220 shown in FIGS. 1 and 2, and the parity bits read from the ECC cells included in the non-volatile memory 220. For example, in a case where the degree of error occurrence of the read data exceeds a predetermined reference value when referring to the parity bits, the cell degradation measurement circuit 235 may output the first cell degradation information indicating that the memory cell which read the data is degraded. For example, the cell degradation measurement circuit 235 may output the first cell degradation information based on a relationship between the read data and the parity bits, before performing the error correction and decoding of the read data, using the parity bit. Although the first cell degradation information may be configured as a specific type of signal, embodiments of the present disclosure are not limited thereto.

Although the cell degradation measurement circuit 235 is illustrated as being disposed separately from the host 100 and the non-volatile memory 220 in FIG. 3, embodiments of the present disclosure are not limited thereto. For example, in some embodiments, the cell degradation measurement circuit 235 may be included in the storage controller 210 shown in FIG. 1. In this case, the storage controller 210 may directly perform the above-described error detection operation to provide the first cell degradation information to the host 100.

Further, although the cell degradation measurement circuit 235 is described as measuring the degree of degradation of the cell for each of the memory cells, it is to be understood that this is for convenience of explanation, and that embodiments of the present disclosure are not limited thereto. For example, in some embodiments, the cell degradation measurement circuit 235 may measure the degree of degradation in units of pages or may measure the degree of degradation in units of blocks including the pages.

Figure 4:
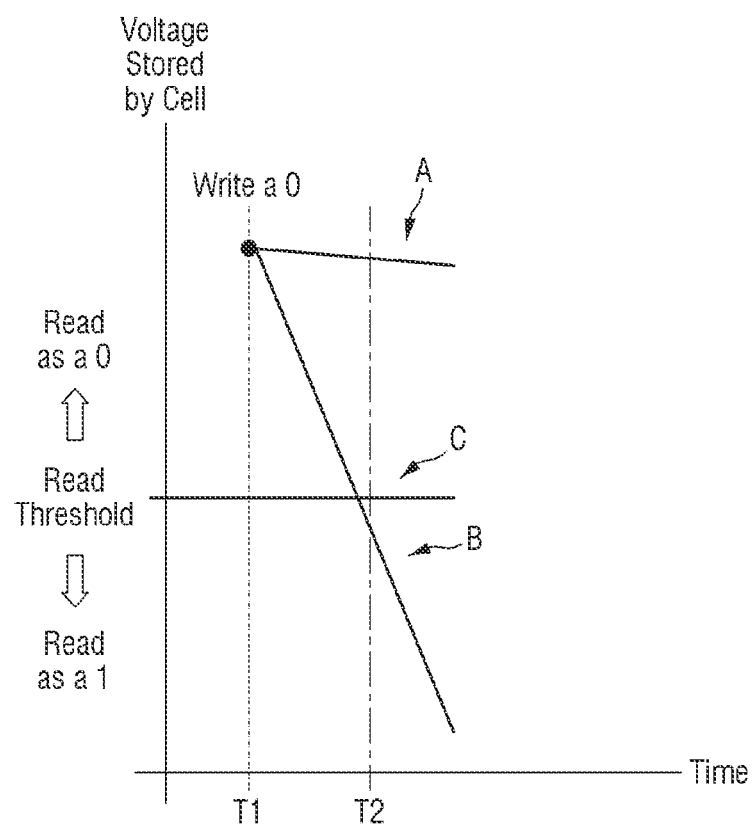
FIG. 4 is an exemplary diagram for describing an operation due to the degradation of the cell included in the non-volatile memory according to some embodiments.

FIG. 4 is an exemplary diagram for describing an operation due to the degradation of the cell included in the non-volatile memory according to some embodiments.

Referring to FIG. 4, first, the first cell A and the second cell B are assumed to be programmed (e.g., written) at the same first time point T1. Further, the first cell A and the second cell B are assumed to be read at the same second time point T2.

Further, it is assumed that data 0 be stored when the voltage stored in the first cell A and the second cell B is about equal to or higher than a read threshold value C, and data 1 be stored when the voltage stored in the first cell A and the second cell B is about equal to or lower than the read threshold value C Programming and erasing of the cell may cause an electrical insulation of the cell and degrade the cell. That is, as a PE cycle in which the data of cell is programmed and erased is repeated, the cell is further degraded and the stored data is likely to flow out, and as the PE cycle is less relatively repeated, the cell is less degraded and the stored data may be held relatively longer.

Still referring to FIG. 4, the second cell B may have a steep slope on the graph because the amount of stored voltage loss is larger than that of the first cell A. That is, the second cell B may be further degraded than the first cell A, and the possibility of data loss may be high.

For example, since the degree of degradation of the cell may vary as described above, the results detected by the cell degradation measurement circuit 235 may include, for example, the number of two cases, as shown. That is, data 0 was equally written in the first cell A and the second cell B at the first time point T1. However, the first cell A maintains a voltage about equal to or higher than the read threshold value C even at the second time point T2, and the written data 0 may be read. On the other hand, the second cell B drops to a voltage about equal to or lower than the read threshold value C at the second time point T2, and data of 1 different from the stored data may be read.

As described above, the cell degradation measurement circuit 235 may provide the first cell degradation information indicating the degree of degradation to the cell in which the stored data and the read data do not match. For example, the cell degradation measurement circuit 235 may provide the first cell degradation information indicating that the cell is degraded, when a value such as, for example, an error occurrence frequency or a bit error rate (BER) of the read data, exceeds a predetermined reference value. However, embodiments of the present disclosure are not limited thereto. For example, in some embodiments, the cell degradation measurement circuit 235 may provide the first cell degradation information using another method.

Figure 5:
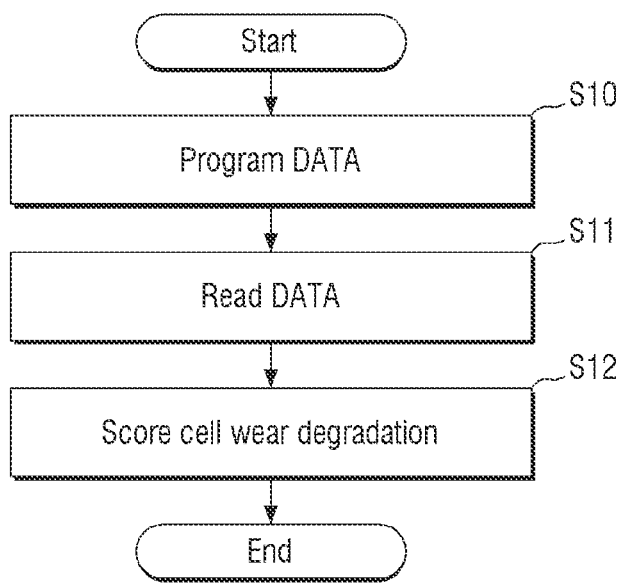
FIG. 5 is an exemplary flowchart for describing an operation of the host-storage system according to some embodiments.

FIG. 5 is an exemplary flowchart for describing an operation of the host-storage system according to some embodiments.

Referring to FIG. 5, the host may provide a cell degradation information request command to the storage device, and the data may be programmed (e.g., written) to the non-volatile memory included in the storage device (S10). Subsequently, the programmed data may be read (S11). Subsequently, the cell degradation measurement circuit may perform an error detection operation on the read data, and score the degree of degradation for each memory cell based on the detection result (S12). Since the above-described operations are substantially the same as those described with reference to FIGS. 3 and 4, for convenience of explanation, a further description of components and technical aspects previously described will be omitted.

Figure 6:
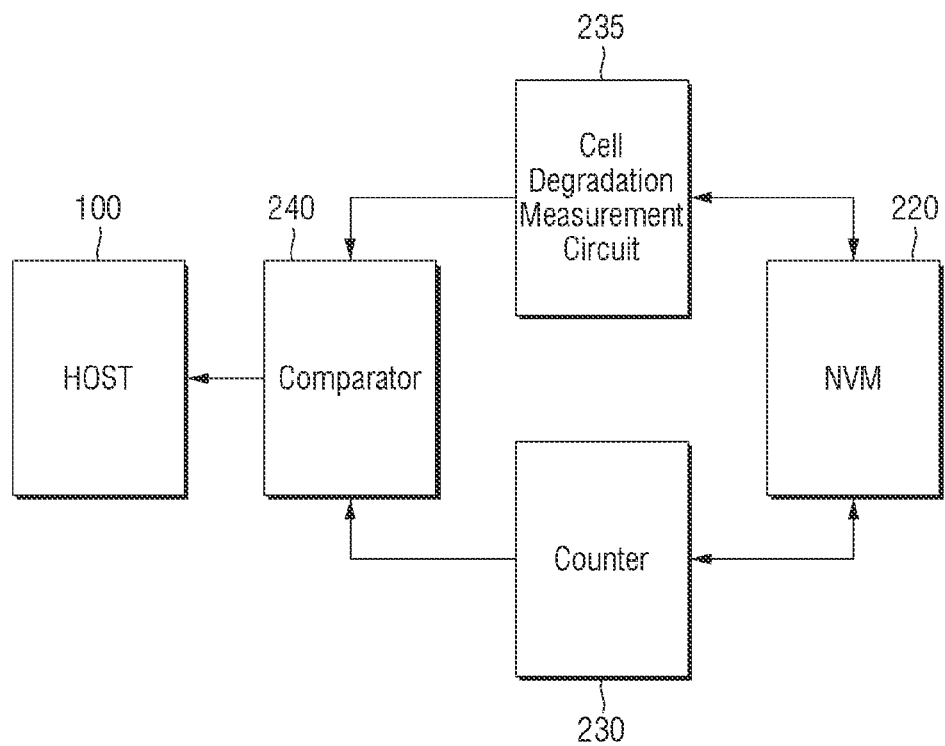
FIG. 6 is an exemplary block diagram for describing an operation of the host-storage system according to some embodiments.

FIG. 6 is an exemplary block diagram for describing an operation of the host-storage system according to some embodiments. For convenience of explanation, a further description of components and technical aspects previously described with reference to FIGS. 1 and 3 will be omitted, and differences will be mainly described below.

Referring to FIG. 6, the host-storage system 10 may further include a counter 230 and a comparator 240. The counter 230 may also be referred to herein as a counter circuit, and the comparator 240 may also be referred to herein as a comparator circuit.

The counter 230 may count the number of times of writing and erasing the data to and from a plurality of memory cells included in the non-volatile memory 220, that is, the number of times of PE cycles. The counter 230 may provide second cell degradation information different from the first cell degradation information provided by the cell degradation measurement circuit 235, based on the number of times of PE cycles.

For example, the cell degradation measurement circuit 235 may write data to the non-volatile memory 220 and then immediately read the data to perform the error detection operation on the data. For example, in embodiments, the read operation performed by the cell degradation measurement circuit 235 to perform the error detection operation may be the next operation immediately performed after the cell degradation measurement circuit 235 writes the data to the non-volatile memory 220, with no other operations performed by the cell degradation measurement circuit 235 therebetween. Thus, the cell degradation measurement circuit 235 may measure and determine the actual degree of degradation of the memory cell in consideration of the influence of the environment.

On the other hand, the counter 230 may count the number of times of PE cycles of a plurality of memory cells included in the non-volatile memory 220, and simply compare the number of times of currently ongoing PE cycles as compared with the number of times of maximum PE cycles supported by the plurality of memory cells, thereby measuring and determining the relative degree of degradation of the cell. For example, although the number of times of maximum PE cycles supported by the plurality of memory cells may correspond to 3K in the case of triple-level cell (TLC), embodiments of the present disclosure are not limited thereto.

That is, there is a difference in that the degree of degradation of the memory cell determined by the cell degradation measurement circuit 235 reflects the actual usage environment of the memory cell, while the degree of degradation of the memory cell determined by the counter 230 determines the relative degree of degradation by simply comparing the maximum supported PE cycle of the memory cell with the currently ongoing PE cycle. Therefore, the determination of the degree of degradation of the memory cell performed by the cell degradation measurement circuit 235 reflects the actual usage environment, and therefore may have increased accuracy.

However, the host-storage system according to some embodiments of the present disclosure may adopt the degree of degradation of the memory cell determined by the counter 230 to provide a reference value for comparing the degree of degradation of the memory cells determined by the cell degradation measurement circuit 235.

The comparator 240 compares the first cell degradation information from the cell degradation measurement circuit 235 with the second cell degradation information from the counter 230, and may provide a cell status signal indicating the current status of the cell to the host 100.

Although the cell degradation measurement circuit 235 is shown as a separate configuration from the counter 230 and the comparator 240 in FIG. 6, embodiments of the present disclosure are not limited thereto. For example, in some embodiments, the counter 230 may be included in the cell degradation measurement circuit 235. In this case, the cell degradation measurement circuit 235 may perform the error detection through the above-described write and read operations of the data to output the first cell degradation information as one of the methods for determining the degree of degradation of the cell, and may also count the number of times of PE cycles to output the second cell degradation information as another method. Further, the comparator 240 may also be included in the cell degradation measurement circuit 235, and in this case, the cell degradation measurement circuit 235 may directly provide the cell status signal to the host 100.

According to embodiments, the counter 230 and the comparator 240 may be implemented as different configurations as shown, and may have a configuration included in the storage controller 210 described with reference to FIG. 1. In this case, the storage controller 210 may be in a status of acquiring the second cell degradation information based on the number of times of maximum supported PE cycles of the memory cell already known and the number of times of performed PE cycles of the memory cell. Subsequently, the storage controller 210 may determine the degree of degradation of the cell, by comparing the first cell degradation information with the second cell degradation information inside the storage controller 210, using the first cell degradation information provided from the cell degradation measurement circuit 235. The storage controller 210 may then directly provide the cell status signal to the host 100.

For example, the comparator 240 may provide a cell warning signal to the host 100 when the degree of degradation of the cell indicated by the first cell degradation information is greater than the degree of degradation of the cell indicated by the second cell degradation information. The warning signal may also be referred to herein as a danger signal. For example, in a case where the degree of degradation of the cell determined by the cell degradation measurement circuit 235 considering the actual environment is greater than the degree of degradation of the cell obtained by comparing the number of times of currently ongoing PE cycles compared with the maximum supported PE cycle of the memory cell, it may mean that the degree of degradation of the current memory cell is relatively further performed. Therefore, the comparator 240 may provide the host 100 with a cell warning signal indicating that the degree of degradation of the cell is performed relatively high. For example, the cell warning signal may include information indicating the expected remaining life of the memory cell. However, embodiments are not limited thereto.

On the other hand, for example, the comparator 240 may provide a cell safety signal to the host 100, when the degree of degradation of the cell indicated by the second cell degradation information is greater than the degree of degradation of the cell indicated by the first cell degradation information. That is, in a case where the degree of degradation of the cell determined by the cell degradation measurement circuit 235 considering the actual environment is smaller than the degree of degradation of the cell obtained by comparing the number of times of currently ongoing PE cycles compared with the maximum supported PE cycle of the memory cell, it may mean that the degree of degradation of the current memory cell is performed relatively low. Therefore, the comparator 240 may provide the host 100 with a cell safety signal indicating that the degree of degradation of the cell is relatively low.

Figure 7:
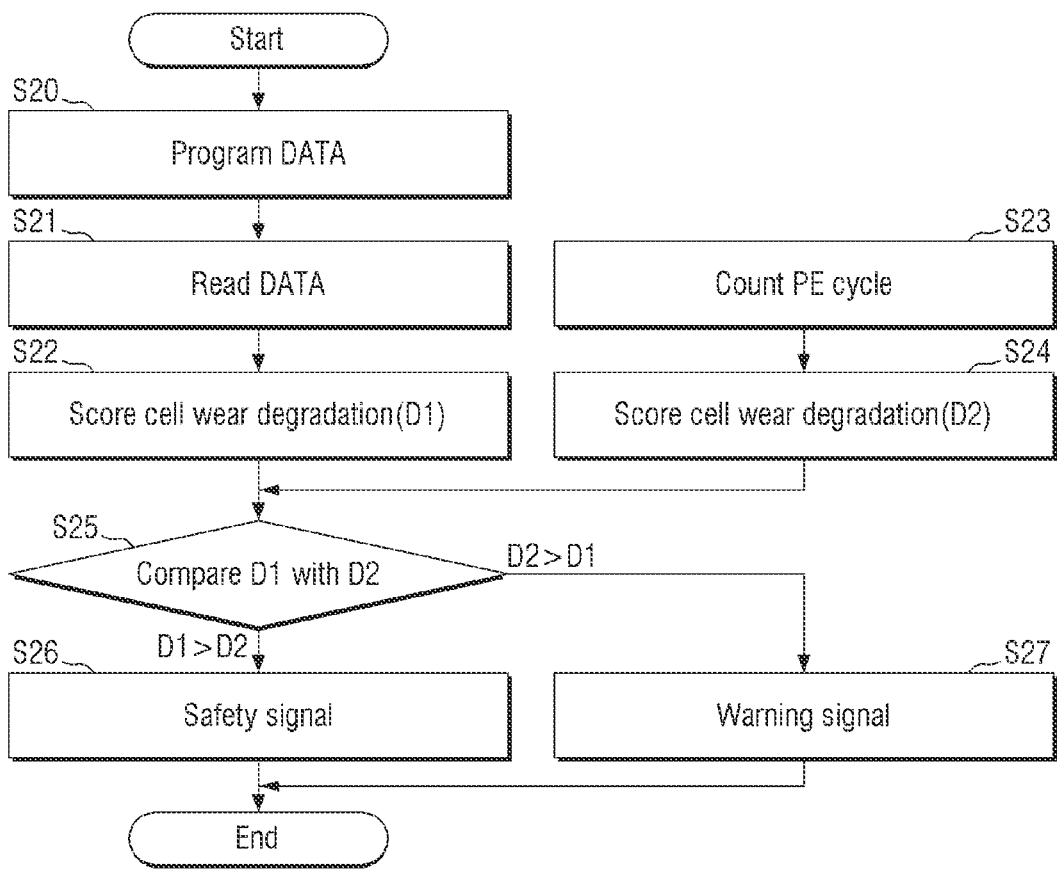
FIG. 7 is an exemplary flowchart for describing an operation of the host-storage system according to some embodiments.

FIG. 7 is an exemplary flowchart for describing an operation of the host-storage system according to some embodiments.

Referring to FIG. 7, the host may provide a cell degradation information request command to the storage device, and the data may be programmed (e.g., written) to the non-volatile memory included in the storage device (S20). Subsequently, the programmed data may be read (S21). Subsequently, the cell degradation measurement circuit may perform an error detection operation on the read data, and may score the degree of degradation for each memory cell based on the detection result (S22). That is, the above-described operation may be substantially the same as that described with reference to FIG. 5.

Next, the number of times of PE cycles of the memory cell may be counted by the counter (S23). The counter may score the degree of degradation of the memory cell based on the number of times of PE cycles of the memory cell (S24).

At this time, for convenience of explanation, the degradation degree score of the memory cell obtained by the cell degradation measurement circuit is set as D1, and the degradation degree score of the memory cell obtained by the counter is set as D2. The more severe the degree of degradation of the memory cell, the lower the degree of degradation score may be.

The comparator may then compare D1 with D2 (S25). That is, the comparator may compare the degree of degradation of the memory cell determined by the cell degradation measurement circuit with the degree of degradation of the memory cell determined by the counter, and may output information on the accuracy status of the memory cell.

For example, when the score D1 determined by the cell degradation measurement circuit is greater than the score D2 determined by the counter (D1>D2), since it indicates that the memory cell is actually in a slightly degraded status, the comparator may provide the safety signal to the host (S26).

On the other hand, when the score D2 determined by the counter is greater than the score D1 determined by the cell degradation measurement circuit (D2>D1), since it indicates that the memory cell is actually in a further degraded status, the comparator may provide a warning signal to the host (S27). As described above, the warning signal may include information indicating the expected life of the corresponding memory cell.

Figure 8:
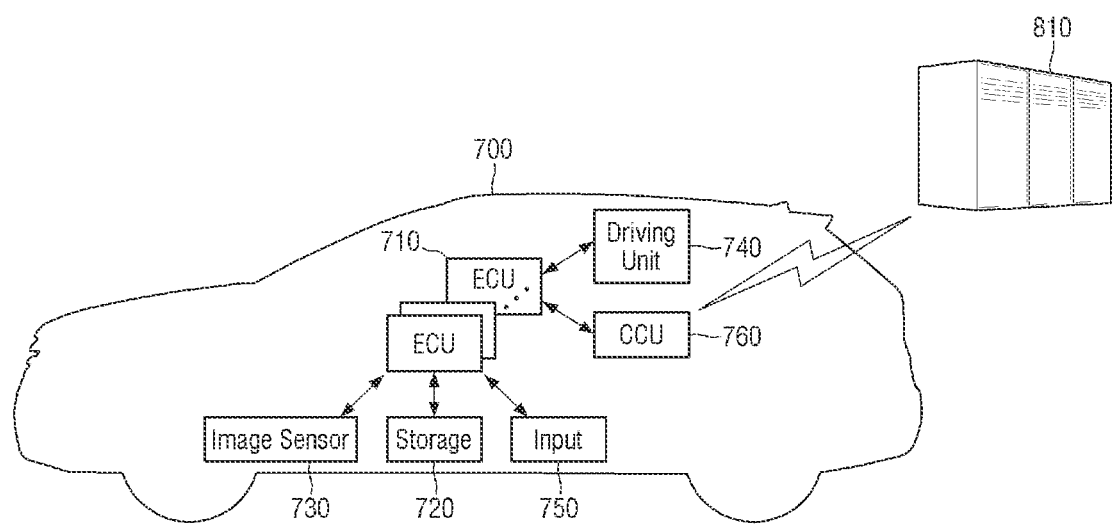
FIG. 8 is a diagram of a vehicle including a storage device according to some embodiments.

FIG. 8 is a diagram of a vehicle including a storage device according to some embodiments.

Referring to FIG. 8, a vehicle 700 may include a plurality of electronic control units (ECU) 710 and a storage device 720.

Each electronic control unit of the plurality of electronic control units 710 is electrically, mechanically, and communicatively connected to at least one of the plurality of devices provided in the vehicle 700, and may control the operation of at least one device based on any one function execution command.

The plurality of devices may include, for example, an image sensor 730 that acquires an image utilized for performing at least one function, a storage device 720 that includes a cell degradation measurement circuit, a counter, a comparator and a non-volatile memory, and a driving unit 740 that performs at least one function.

For example, the image sensor 730 may correspond to an automotive image sensor including a unit pixel.

The driving unit 740 may include, for example, a fan and compressor of an air conditioner, a fan of a ventilation device, an engine and a motor of a power device, a motor of a steering device, a motor and a valve of a brake device, an opening/closing device of a door or a tailgate, etc.

The plurality of electronic control units 710 may communicate with the image sensor 730 and the driving unit 740 using, for example, at least one of an Ethernet, a low voltage differential signaling (LVDS) communication protocol, and a local interconnect network (LIN) communication protocol.

The plurality of electronic control units 710 determine whether a function is to be performed based on the information acquired through the cell degradation measurement circuit, the counter, the comparator and the non-volatile memory included in the storage device 720, and when it is determined that a function is to be performed, the plurality of electronic control units 710 control the operation of the driving unit 740 that performs the function, and may control an amount of operation based on the acquired information. For example, the aforementioned configuration included in the storage device 720 may be the same as each of the configurations described with reference to FIGS. 1 to 7.

The plurality of electronic control units 710 may control the operation of the driving unit 740 that performs the function based on the function execution command that is input through the input unit 750, and are also able to check a setting amount corresponding to the information that is input through the input unit 750 and control the operation of the driving unit 740 that performs the function based on the checked setting amount.

Each electronic control unit 710 may control any one function independently, or may control any one function in cooperation with another electronic control unit(s).

For example, when a distance to an obstacle detected through a distance detection unit is within a reference distance, an electronic control unit of a collision prevention device may output a warning sound for a collision with the obstacle through a speaker.

An electronic control unit of an autonomous driving control device may receive, for example, navigation information, road image information, and distance information to obstacles in cooperation with the electronic control unit of the vehicle terminal, the electronic control unit of the image acquisition unit, and the electronic control unit of the collision prevention device, and may control the power device, the brake device, and the steering device using the received information, thereby performing the autonomous driving.

A connectivity control unit (CCU) 760 is electrically, mechanically, and communicatively connected to each of the plurality of electronic control units 710, and communicates with each of the plurality of electronic control units 710.

That is, the connectivity control unit 760 may directly communicate with the plurality of electronic control units 710 provided inside the vehicle, may communicate with an external server, and also may communicate with an external terminal through an interface.

The connectivity control unit 760 may communicate with the plurality of electronic control units 710, and may communicate with a server 810, using, for example, an antenna and RF communication.

Further, the connectivity control unit 760 may communicate with the server 810 by wireless communication. The wireless communication between the connectivity control unit 760 and the server 810 may be performed through various wireless communication protocols such as, for example, a global system for mobile communication (GSM) protocol, a code division multiple access (CDMA) protocol, a wideband code division multiple access (WCDMA) protocol, a universal mobile telecommunications system (UMTS) protocol, a time division multiple access (TDMA) protocol, and a long term evolution (LTE) protocol, in addition to utilizing a WIFI module and a wireless broadband module.

Figure 9:
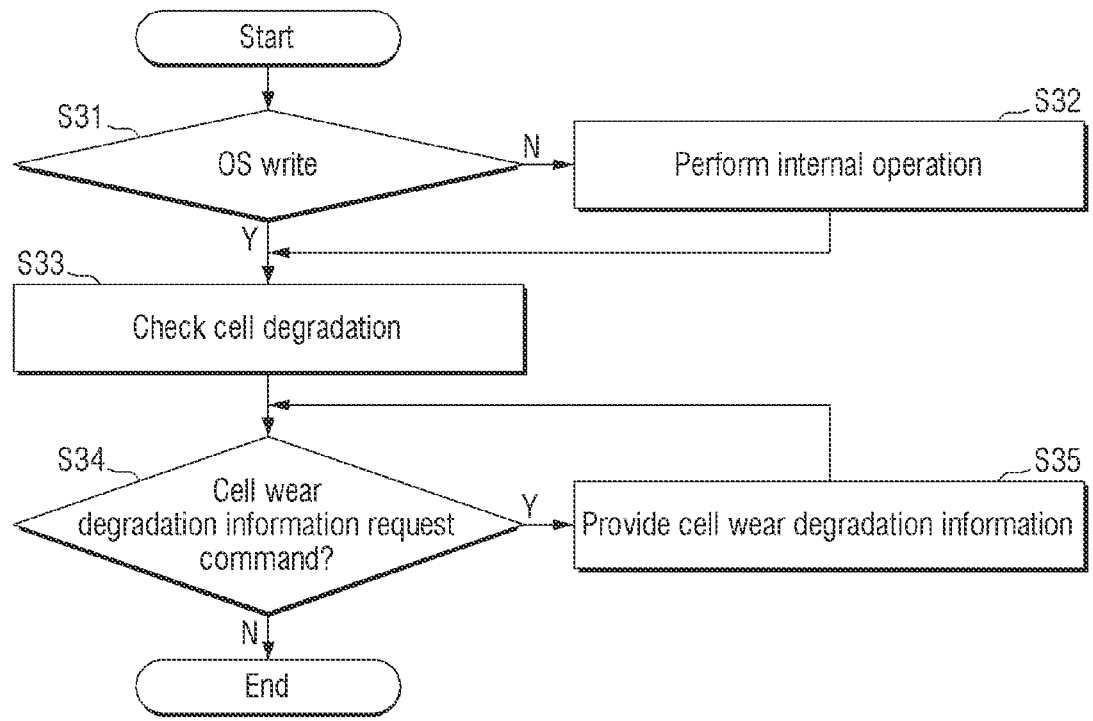
FIG. 9 is an exemplary flowchart for describing an operation of the vehicle including the storage device according to some embodiments.

FIG. 9 is an exemplary flowchart for describing an operation of the vehicle including the storage device according to some embodiments.

Referring to FIG. 9, for example, when the vehicle is started, it may be checked whether an operating system (OS) is written on the storage device included in the vehicle by the storage controller (S31). In some embodiments, it may also be checked whether to read the operating system from the storage device.

When the operating system is not written when booted up (N of S31), the storage device may perform an internal operation. For example, the storage device itself may generate a dummy write to determine the degree of degradation of a plurality of memory cells included in the non-volatile memory, and the dummy write may be programmed in any one of the plurality of memory cells. However, embodiments are not limited thereto. For example, in some embodiments, the dummy write may be programmed into pages or blocks depending on the characteristics of the product.

The memory cell in which the dummy write is programmed may vary depending on the particular situation. For example, the dummy write may be programmed into pages where no data is written when the degrees of degradation of multiple memory cells are similar through the wear leveling. Alternatively, for example, in the case of single level cell (SLC), the dummy write may be set to be programmed first to a block on the edge side to preferentially determine the degree of degradation on the block of an edge side on which the degree of degradation may be relatively severe. However, embodiments are not limited thereto, and the dummy write may be programmed according to, for example, a user's settings and product characteristics.

When the operating system is written (Y of S31), the storage device may check the degree of degradation of the memory cell (S33). The process of checking the degree of memory cell degradation of the storage device may be substantially the same as that described with reference to FIGS. 3 to 7. On the other hand, the storage device may temporarily store the cell degradation information about the degree of degradation of the memory cell in a register included therein.

Next, it may be checked whether the degradation information request command regarding the memory cell is received from the host (S34). When the cell degradation information request command regarding the memory cell is received from the host, the storage device may provide the cell degradation information temporarily stored in the register to the host (S35). The storage device may continue to provide the cell degradation information to the host until the cell degradation information request command regarding the memory cell is not received from the host.

Figure 10:
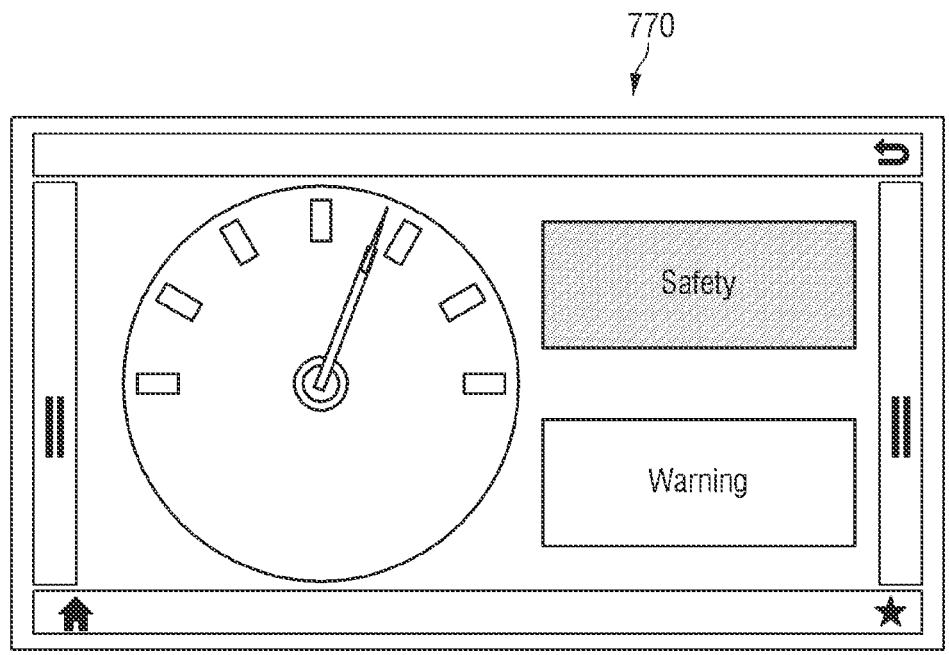
FIG. 10 is an exemplary diagram for describing an operation of a display unit included in the vehicle according to some embodiments.

FIG. 10 is an exemplary diagram for describing an operation of a display unit included in the vehicle according to some embodiments.

Referring to FIG. 10, the vehicle may further include a display unit 770. The display unit 770 is connected to the electronic control unit 710 described with reference to FIG. 8, and may display the status of the vehicle under the control of the electronic control unit 710. For example, as shown in FIG. 10, the display unit 770 may display the status of the vehicle reflecting the degree of degradation of the memory cell in the form of a gauge, and may also display the status of the vehicle through textual indicator such as a "safety" indicator corresponding to a safety signal or "warning" indicator corresponding to a warning signal.

For example, the display unit 770 may display the status of the vehicle based on the cell status signals described with reference to FIGS. 3 to 7. That is, when the degree of degradation of the cell indicated by the first cell degradation information output from the cell degradation measurement circuit 235 is greater than the degree of degradation of the cell indicated by the second cell degradation information output from the counter 230, the display unit 770 may output a screen indicating the "dangerous" status of the vehicle. On the contrary, when the degree of degradation of the cell indicated by the degradation information of the second cell is greater than the degree of degradation of the cell indicated by the degradation information of the first cell, the display unit 770 may output a screen indicating the "safety" status of the vehicle. However, embodiments of the present disclosure are not limited thereto, and the display unit 770 may display the status of the vehicle depending on the degree of degradation of the memory cell in various forms according to embodiments.

As a program and erase cycle (PE cycle) of data increases, a storage device storing the data may deteriorate, and its life may decrease. For example, as the PE cycle increases, the data may not be written to the storage device, or the stored data may be lost, resulting in a problem of degradation in reliability. Furthermore, when data is lost while using the storage device, performance degradation of the entire system in which the storage device is included may be caused.

Referring to a comparative example, the degree of degradation of a memory cell is typically determined based only on the number of times PE cycles occur. However, this approach may not accurately indicate the degree of degradation of an actual memory cell depending on, for example, an environment of the storage device or a vehicle including the storage device. Embodiments of the present disclosure may adopt the degree of degradation of a memory cell determined by a counter to provide a reference value for comparing the degree of degradation of memory cells determined by a cell degradation measurement circuit, as described above, which may result in increased performance and increased life of the storage device.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A method of operating a storage device, the method comprising:
   receiving a cell degradation information request command that requests cell degradation information from a host;
   writing data to any one of a plurality of memory cells included in the storage device in response to the cell degradation information request command;
   reading the written data after a predetermined time has elapsed; and
   providing first cell degradation information to the host,
   wherein the first cell degradation information is generated based on an error detection operation performed on the read data, and the first cell degradation information is generated based on a relationship between the read data and a parity bit, and
   the error detection operation is performed before an error correction operation is performed and the read data is decoded,
   the method further comprising:
   counting a number of times of writing and erasing the data to and from the plurality of memory cells;
   providing second cell degradation information different from the first cell degradation information and based on the number of times counted and a known maximum number of times; and
   providing a cell status signal by comparing the first cell degradation information with the second cell degradation information.

2. The method of operating the storage device of claim 1, wherein the first cell degradation information is provided when an error occurrence frequency of the read data exceeds a predetermined reference value.

3. The method of operating the storage device of claim 1, wherein the reading of the written data occurs immediately after the writing of the data to any one of the plurality of memory cells.

4. The method of operating the storage device of claim 1, wherein a cell warning signal is provided when a degree of degradation of a cell indicated by the first cell degradation information is greater than a degree of degradation of a cell indicated by the second cell degradation information.

5. The method of operating the storage device of claim 1, wherein a cell safety signal is provided when a degree of degradation of a cell indicated by the second cell degradation information is greater than a degree of degradation of a cell indicated by the first cell degradation information.

6. The method of operating the storage device of claim 4, wherein the cell warning signal comprises information indicating an expected remaining life of the cell indicated by the first cell degradation information.

7. The method of operating the storage device of claim 1, wherein the storage device comprises a cell degradation measurement circuit comprising an error correction code (ECC) engine, and
the cell degradation measurement circuit generates the first cell degradation information based on the error detection operation performed on the read data.

8. A storage device, comprising:
a cell degradation measurement circuit configured to receive a cell degradation information request command that requests cell degradation information from a host, and provide first cell degradation information to the host in response to the cell degradation information request command;
a counter circuit;
a comparator circuit; and
a non-volatile memory comprising a plurality of memory cells,
wherein the cell degradation measurement circuit writes data to any one of the plurality of memory cells in response to the cell degradation information request command,
the cell degradation measurement circuit reads the written data after a predetermined time has elapsed,
the first cell degradation information is generated in an error detection operation performed on the read data, and the first cell degradation information is generated based on a relationship between the read data and a parity bit,
the error detection operation is performed before an error correction operation is performed and the read data is decoded,
the counter circuit counts a number of times of writing and erasing the data to and from the plurality of memory cells, and provides second cell degradation information different from the first cell degradation information and based on the number of times counted and a known maximum number of times, and
the comparator circuit compares the first cell degradation information with the second cell degradation information and provides a cell status signal.

9. The storage device of claim 8, wherein the cell degradation measurement circuit provides the first cell degradation information when an error occurrence frequency of the read data exceeds a predetermined reference value.

10. The storage device of claim 8, wherein the written data is read immediately after writing the data to any one of the plurality of memory cells.

11. The storage device of claim 8, wherein the comparator circuit provides a cell warning signal to the host when a degree of degradation of a cell indicated by the first cell degradation information is greater than a degree of degradation of a cell indicated by the second cell degradation information.

12. The storage device of claim 8, wherein the comparator circuit provides a cell safety signal to the host when a degree of degradation of a cell indicated by the second cell degradation information is greater than a degree of degradation of a cell indicated by the first cell degradation information.

13. The storage device of claim 11, wherein the cell warning signal comprises information indicating an expected remaining life of the cell indicated by the first cell degradation information.

14. The storage device of claim 8, wherein the cell degradation measurement circuit comprises an error correction code (ECC) engine.

15. A vehicle comprising:
an electronic control unit; and
a storage device connected to the electronic control unit,
wherein the storage device comprises:
a cell degradation measurement circuit which receives a cell degradation information request command from the electronic control unit, and provides first cell degradation information to the electronic control unit in response to the cell degradation information request command; and
a non-volatile memory comprising a plurality of memory cells,
wherein the cell degradation measurement circuit writes data to any one of the plurality of memory cells in response to the cell degradation information request command,
the cell degradation measurement circuit reads the written data after a predetermined time has elapsed,
the first cell degradation information is generated in an error detection operation performed on the read data, and the first cell degradation information is generated based on a relationship between the read data and a parity bit, and
the error detection operation is performed before an error correction operation is performed and the read data is decoded,
the vehicle further comprising:
a counter circuit configured to count a number of times of writing and erasing the data to and from the plurality of memory cells, and output second cell degradation information different from the first cell degradation information and based on the number of times counted and a known maximum number of times;
a comparator circuit configured to provide a cell status signal by comparing the first cell degradation information with the second cell degradation information; and
a display unit configured to display a status of the vehicle based on the cell status signal,
wherein the display unit outputs a warning status when a degree of degradation of a cell indicated by the first cell degradation information is greater than a degree of degradation of a cell indicated by the second cell degradation information, and the display unit outputs a safety status when a degree of degradation of a cell indicated by the second cell degradation information is greater than the degree of degradation of the cell indicated by the first cell degradation information.

* * * * *